United States Patent

[11] 3,626,204

| [72] | Inventor | Martin Brandon<br>Harlow, England |
|---|---|---|
| [21] | Appl. No. | 23,135 |
| [22] | Filed | Mar. 27, 1970 |
| [45] | Patented | Dec. 7, 1971 |
| [73] | Assignee | International Standard Electric Corporation<br>New York, N.Y. |
| [32] | Priority | Apr. 23, 1969 |
| [33] | | Great Britain |
| [31] | | 20,646/69 |

[54] FREQUENCY-BIASED RATEMETER
9 Claims, 7 Drawing Figs.

[52] U.S. Cl. ................................................. 307/233,
307/228, 307/295, 324/78 E, 324/189, 328/140
[51] Int. Cl. ........................................................ H03d 13/00
[50] Field of Search .......................................... 307/233,
295, 228; 328/136, 140, 127; 324/78 E, 189;
235/92 F

[56] References Cited
UNITED STATES PATENTS

| 3,176,162 | 3/1965 | Kawashima et al. | 307/228 |
| 3,302,040 | 1/1967 | Dryden | 307/228 |
| 3,056,047 | 9/1962 | Yarborough | 307/233 X |
| 3,219,940 | 11/1965 | Yarborough | 328/127 X |
| 3,031,583 | 4/1962 | Murphy | 307/228 X |
| 3,388,219 | 6/1968 | Davis | 307/233 X |

*Primary Examiner*—Stanley T. Krawczewicz
*Attorneys*—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

ABSTRACT: A frequency-biased ratemeter or frequency-to-voltage converter wherein a capacitor is continuously charged at a first constant rate and discharged at a second constant rate for a period of time which is determined by the frequency of an input pulse signal. The ratio of charge time to discharge time can be altered to bias the ratemeter so as to make it more responsive to high or low frequencies of input signal.

Inventor
MARTIN BRANDON
By Herbert Stern
Attorney

FREQUENCY-BIASED RATEMETER

BACKGROUND OF THE INVENTION

This invention relates to a frequency-biased ratemeter or frequency-to-voltage converter and more particularly, to a frequency modulated, continuous wave altimeter, utilizing ratemeters.

Presently known ratemeters provide an output voltage that is proportional to the main input frequency. It is desirable in altimeters, however, that the ratemeter should be biased so as to be more responsive to the lower frequencies produced of its input. This is due to the fact that the lower frequencies produced in the beat signals reflect more accurately the true height of the aircraft carrying the altimeter, these lower frequencies being consistent with the shortest aircraft to ground reflection path.

SUMMARY OF THE INVENTION

Therefore, the main object of this invention is to provide a ratemeter which is biased so as to be more responsive to a desired frequency range.

According to the present invention, there is provided a frequency-biased ratemeter having an input signal comprising a series of pulses, a first capacitor, first means coupled to said input signal and to said first capacitor for providing a rising and falling waveform across said capacitor, said rising and falling waveform having a frequency proportional to the frequency of said pulse input signal, second means coupled to said first means for determining the amplitude of the voltage on said capacitor, and a feedback loop for coupling the output of said second means to said first means so as to control said first means.

Further objects and features of this invention will become more apparent by reference to the following description taken in conjunction with the accompanying drawings in which:

DESCRIPTION OF THE PREFERRED EMBODIMENT

Figure 1:
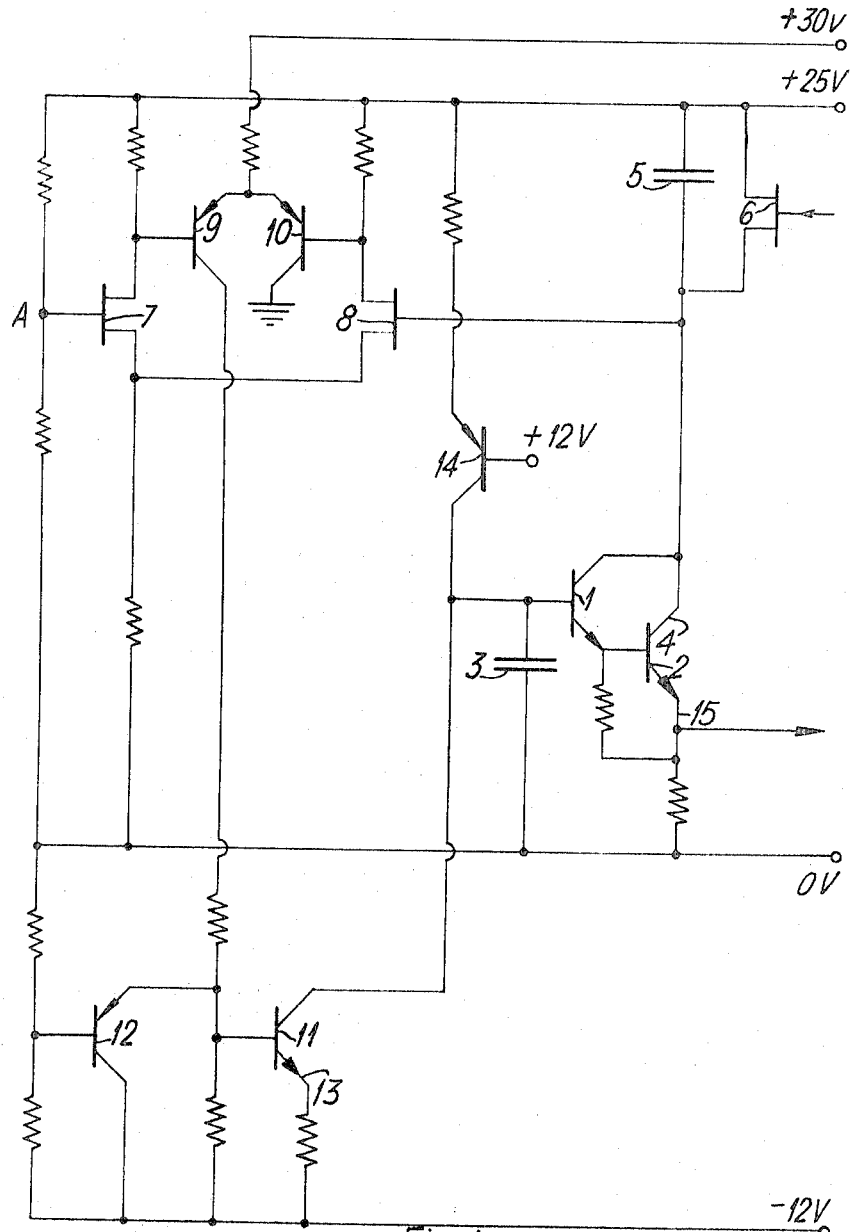
FIG. 1 is a circuit diagram of a preferred embodiment of the instant invention.
Figure 2:
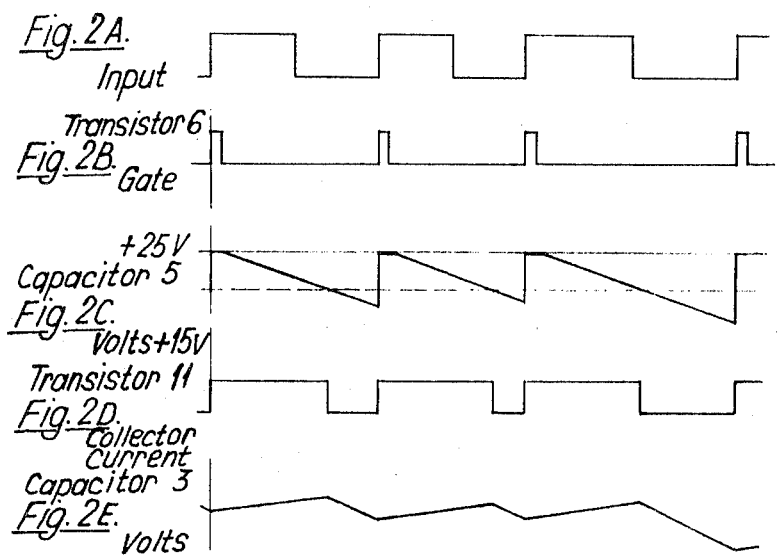
FIGS. 2A–2E illustrate the waveforms at designated points in the diagram of FIG. 1.

Referring to FIG. 1, capacitor 5 is negatively charged from an initial voltage of +25 v. downward, by way of transistor 1 and transistor 2 which form a Darlington pair. The input to the Darlington pair is controlled by capacitor 3 and the collector 4 of transistor 2 provides a constant current source for negatively charging capacitor 5. The input to the circuit is a pulse train derived from the signal of varying frequency shown in FIG. 2A. The signal of varying frequency is first of all squared, as shown in FIG. 2B and applied to a pulse generator (now shown) which produces extremely narrow pulses, e.g., 200 nsecs. duration, for each positive going zero crossing of the squared waveform. These pulses (FIG. 2B) are applied to the gate electrode of a field-effect transistor 6. Transistor 6 conducts and effectively short circuits capacitor 5, thereby discharging it and bringing it back to +25 v., as shown in FIG. 2C. Field-effect transistors 7 and 8 provide a long-tail pair differential amplifier which compares the voltage of the capacitor 5 with the reference voltage, say +15v., see FIG. 2C, obtained at point A through a resistive voltage divider. When the voltage on capacitor 5 goes negative with respect to the reference voltage, the differential amplifier output taken from transistor 7 is applied, via an amplifying stage provided by the transistors 9 and 10 forming a long-tail pair, to the base of transistor 11, the collector current of which is shown in FIG. 2D, thereby causing the latter to conduct. The base potential of transistor 11 is clamped by transistor 12 to a reference potential applied at the base of transistor 12. The emitter 13 of transistor 11 is therefore raised to a defined voltage positive with respect to the −12 v. supply when transistor 9 conducts and a defined current is obtained from the collector of transistor 11. This current, say 800 microamps, is applied to capacitor 3. A second constant current, say 20 microamps, derived from transistor 14 is applied continuously to charge capacitor 3.

Thus, capacitor 3 is charged slowly at a first, steady low rate and discharged briefly at a second steady but higher rate, the charge/discharge time ratio being dependent on the instantaneous frequency of the varying frequency signal. If the frequency of the signal remains constant, the circuit achieves a condition where the total charge and discharge on capacitor 3 are equal and the average voltage is constant. Suppose now the signal frequency falls, so that the interval between the input pulses at the gate electrode of transistor 6 increases. Capacitor 5 will fall below the +15 v. reference voltage for a longer period of time, transistor 11 will conduct for a longer period and capacitor 3 will discharge more than it charges. The overall lowering of the voltage on capacitor 3 results in a change in the charging current for capacitor 5, through transistor 2, and if the signal frequency does not change any further, the circuit will stabilize with a lower average voltage capacitor 3. Conversely, if the signal frequency increases, capacitor 5 will remain for less time below +15 v. and capacitor 3 will charge more than it discharges. Again, feedback is applied through transistors 1 and 2 to capacitor 5. The output of the circuit is a DC signal taken from the emitter 15 of transistor 2.

As described above, with a constant charging current for capacitor 3 of 20 microamps and a controlled discharge current of 800 microamps in the circuit for only a small percentage of the total time, any variation in the time that transistor 11 conducts has a considerable effect on the overall charge on capacitor 3, which is shown in FIG. 2E. The effect is for the circuit to favor the lower frequencies, i.e., it is more sensitive to the lower frequencies in a signal containing a range of varying frequencies. Conversely, if transistor 14 supplied a constant charging current greater than the discharge current of transistor 11, the circuit would be biased toward the higher frequencies in the signal. If the two currents are equal, the circuit becomes an average-ratemeter.

Figure 3:
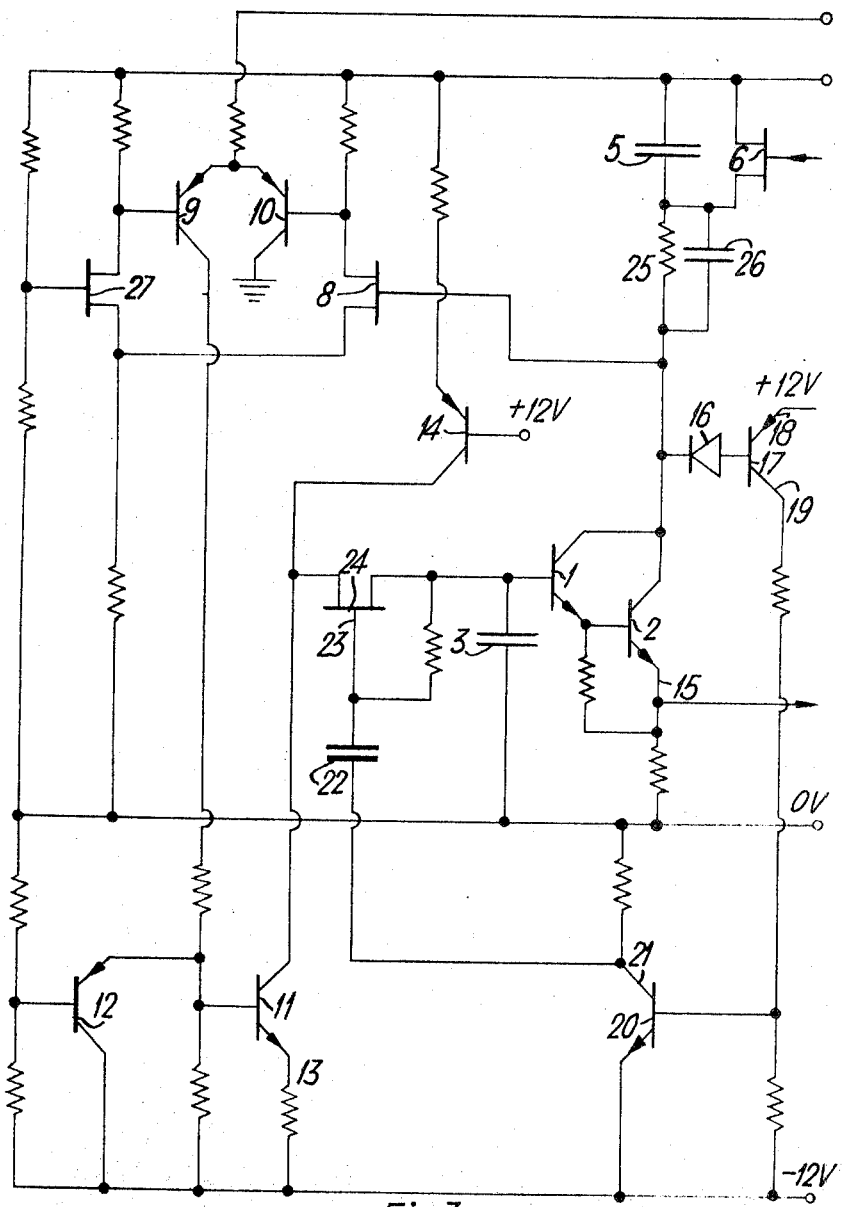
FIG. 3 is a circuit diagram embodying modifications to the ratemeter shown in FIG. 1.

It may happen that for some reason or other there is a temporary loss of input to the circuit. This condition causes an extremely long ramp in the charging characteristic of capacitor 5 with the result that the voltage on capacitor 5 goes too far below the +15 v. level for too long a time. Because the circuit as described has a low frequency bias, the temporary loss of input signal affects the output for a period of time far greater than the duration of the loss of signal. To overcome this the circuit can be modified as shown in FIG. 3. A diode 16 is connected between the collector of transistor 2 and the base of another transistor 17, the emitter 18 of which is tied to a +12 v. supply. When capacitor 5 drops below a second reference voltage lower than the +15 v. reference, say +11 v., transistor 17 conducts. The collector 19 of transistor 17 is connected to the base of another transistor, 20, which conducts when transistor 17 conducts and its collector goes negative. The collector 21 of transistor 20 is connected, via a capacitor 22, to the gate electrode 23 of a field-effect transistor 24, causing the latter to switch off. Thus, if capacitor 5 falls below the second, lower threshold voltage, capacitor 3 is isolated from both transistors 11 and 14. When the input signal returns to its normal range of values, transistor 24 is unblocked and the circuit functions normally. It will be noted that while transistor 24 is blocked, capacitor 3 will still control the Darlington transistors 1 and 2, with its last-known voltage, which will not be far from the correct voltage by the time transistor 24 is once again conducting. Thus, the circuit will maintain its output at more or less the correct level in spite of a temporary loss of signal.

To improve still further the performance of the circuit, bearing in mind that transistor 6 cannot discharge capacitor 5 instantaneously, a resistor 25 may be inserted between capacitor 5 and the collector of transistor 2. This resistor, shunted by a capacitor 26, drops the voltage on capacitor 5 proportional to the current, so that at the end of each input pulse the incomplete discharge of capacitor 5 is compensated by a small shift in the reference voltage relative to the gate of transistor 7.

To reduce the effects of leakage currents the upper end of capacitor 5 may be connected to subsidiary circuit. The feedback current of an operational amplifier could provide the charging current of capacitor 5.

It is to be understood that the foregoing description of specific examples of this invention is made by way of example only and is not to be considered as a limitation on its scope.

I claim:

1. A frequency-biased ratemeter having an input signal consisting of a series of pulses, comprising:
   a first capacitor;
   a second capacitor;
   means coupled to said second capacitor for charging said second capacitor for a first period of time at a first constant rate;
   means coupled to said second capacitor for discharging said second capacitor for a second period of time variable at a second constant rate;
   first means coupled to said first capacitor and to said input signal for charging said first capacitor at a rate of dependent on the charge on said second capacitor;
   second means coupled to said first capacitor for discharging said first capacitor during each pulse of the input signal, for providing a rising and falling waveform across said first capacitor, said rising and falling waveform having a frequency proportional to the frequency of said pulse input signal;
   third means coupled to said first means for determining the amplitude of the voltage on said first capacitor; and
   fourth means coupled between said third means and said discharge means for altering the ratio between said first and second periods of time, said fourth means being responsive to the frequency of said input signal.

2. A frequency-biased ratemeter, according to claim 1, wherein said third means comprises:
   means for comparing the voltage of said first comparator with a first reference voltage, the means for discharging the second capacitor being responsive to said fourth means so as to discharge the second capacitor when the voltage on the first capacitor is less than said first reference voltage.

3. A frequency-biased ratemeter, according to claim 2, wherein said second means comprises a switch responsive to said input pulse signal, the switch short-circuiting the first capacitor for the duration of each pulse of said signal.

4. A frequency-biased ratemeter, according to claim 3, wherein said second means is a field-effect transistor.

5. A frequency-biased ratemeter, according to claim 3, wherein said third means comprises a pair of field-effect transistors in a long-tail pair configuration, said first capacitor being connected to the gate electrode of one of said field-effect transistors, and the reference voltage being applied to the gate electrode of the other field-effect transistor.

6. A frequency-biased ratemeter, according to claim 3, wherein said first means comprises a pair of transistors coupled in a Darlington pair configuration, said second capacitor being coupled to the base input of the Darlington pair, and the first capacitor being connected between the collectors of the Darlington pair and a charging current source.

7. A frequency-biased ratemeter, according to claim 3, further comprising fifth means for isolating the second capacitor from its charging and discharging means in response to a temporary loss of said input pulse signal, said fifth means reconnecting said second capacitor to its charging and discharging means upon restoration of said pulse input signal.

8. A frequency-biased ratemeter, according to claim 7, wherein said fifth means comprises:
   sixth means for comparing the voltage on said first capacitor with a second reference voltage, said second reference voltage being lower than said first reference voltage; and
   seventh means responsive to the output of said sixth means, said seventh means being connected between said second capacitor and its charging and discharging means.

9. A frequency-biased ratemeter, according to claim 8, wherein the rate of discharge of said second capacitor is greater than the rate of charge of said second capacitor.

* * * * *